(12) United States Patent
Mariappasamy et al.

(10) Patent No.: US 10,062,146 B2
(45) Date of Patent: Aug. 28, 2018

(54) SYSTEM AND METHOD FOR MORPHING A CAD DESIGN ELEMENT

(71) Applicant: Detroit Engineered Products, Inc., Troy, MI (US)

(72) Inventors: Radhakrishnan Mariappasamy, Troy, MI (US); Radha Damodaran, Chennai (IN)

(73) Assignee: Detroit Engineered Products, Inc., Troy, MI (US)

( * ) Notice: Subject to any disclaimer, the term of this patent is extended or adjusted under 35 U.S.C. 154(b) by 0 days.

(21) Appl. No.: 15/682,032

(22) Filed: Aug. 21, 2017

(65) Prior Publication Data

US 2017/0345128 A1 Nov. 30, 2017

Related U.S. Application Data

(63) Continuation of application No. 15/350,916, filed on Nov. 14, 2016, now Pat. No. 9,741,094, which is a continuation of application No. 13/900,652, filed on May 23, 2013, now Pat. No. 9,495,726.

(60) Provisional application No. 61/650,714, filed on May 23, 2012.

(51) Int. Cl.
*G06T 3/00* (2006.01)
*G06F 17/50* (2006.01)
*G06T 1/00* (2006.01)

(52) U.S. Cl.
CPC ........ *G06T 3/0093* (2013.01); *G06F 17/5086* (2013.01); *G06T 3/0006* (2013.01); *G06F 2217/16* (2013.01); *G06T 1/0064* (2013.01); *G06T 2207/20036* (2013.01); *G06T 2210/04* (2013.01); *G06T 2210/44* (2013.01)

(58) Field of Classification Search
CPC ... G06T 1/0064; G06T 3/0006; G06T 3/0093; G06T 2207/20036; G06T 2210/44; G06T 2210/04; G06F 2217/16; G06F 17/5086
See application file for complete search history.

(56) References Cited

U.S. PATENT DOCUMENTS

| | | |
|---|---|---|
| 6,731,280 B1 | 5/2004 | Koelman |
| 2002/0041285 A1 | 4/2002 | Hunter |
| 2003/0063778 A1 | 4/2003 | Rowe |
| 2006/0023923 A1 | 2/2006 | Geng |
| 2006/0031057 A1 | 2/2006 | Smith |
| 2008/0024499 A1 | 1/2008 | Bateman |
| 2008/0266325 A1 | 10/2008 | Niu |
| 2009/0295803 A1 | 12/2009 | Young |

(Continued)

*Primary Examiner* — Jwalant Amin
(74) *Attorney, Agent, or Firm* — Neustel Law Offices (57) ABSTRACT

A system and method for morphing a design element which precisely and efficiently morphs a design element within a data file to new target parameters by changing its general proportions, dimensions or shape. The present invention is generally a computer software program which loads an existing data file which includes one or more design elements, such as parts or an assembly of parts, and then automatically morphs the design element's dimensions, proportions and/or shapes to meet target parameters input by a user. The present invention will create several groups of points corresponding to each surface and associated bounding curves of the existing design. It will then morph each group into a new shape as per the input requirements by the user, fit the morphed group into an infinite surface, create boundary curves for each morphed group and then trim the infinite surface to create the new, morphed design element.

17 Claims, 7 Drawing Sheets

(56) References Cited

U.S. PATENT DOCUMENTS

2010/0095526 A1   4/2010  Derrien
2012/0230566 A1   9/2012  Dean
2012/0314021 A1  12/2012  Tsang

SYSTEM AND METHOD FOR MORPHING A CAD DESIGN ELEMENT

CROSS REFERENCE TO RELATED APPLICATIONS

The present application is a continuation of U.S. application Ser. No. 15/350,916 filed on Nov. 14, 2016, which is a continuation of U.S. application Ser. No. 13/900,652 filed on May 23, 2013 now issued as U.S. Pat. No. 9,495,726, which claims priority to U.S. Provisional Application No. 61/650,714 filed May 23, 2012. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

The present invention relates generally to a system and method for morphing a design element which precisely and efficiently morphs a design element within a data file to new target parameters by changing its general proportions, dimensions or shape.

Related Art

Computer-aided-design (CAD) software programs are commonly used across a wide range of industries for the design of parts, buildings, devices, assemblies, etc. Often, a new design needed to be entered into such a CAD software program will in some manners be related to a previous design which has already been entered into such a program, with the exception of geometrical changes such as dimensions and proportions.

In the past, individuals wishing to create such new designs have either been forced to start a new drawing from scratch, thus negating any usefulness of the previous, related design, or use the control polygon (i.e. control net) attached to each surface of the CAD design element to morph the surface. The latter method merely approximates the morphing of the geometry and will often not allow the user to achieve a high degree of precision with respect to matching target requirements for the new drawing. In areas such as building design or machining parts, such a low degree of precision can be extremely costly.

Control polygon morphing as known in the prior art often results in gaps between adjacent surfaces, which will require the user to manually fill in the gaps and make other adjustments to complete the transition of the drawing to meet the target requirements. Further, users are forced to morph a single surface at a time which can be extremely time consuming and is prone to error, thus reducing precision. Finally, prior art systems do not synchronize different types of geometric data such as CAD, CAE, STL and other visualization data corresponding to a part of assembly.

Because of the inherent problems with the related art, there is a need for a new and improved system and method for precisely and efficiently morphing the shape of a design or alternately the CAD data to new target requirements by changing the general proportions, dimensions or shape of the existing design.

SUMMARY

The invention generally relates to a system and method for morphing a CAD design element which precisely and efficiently morphs the design within a data file to new target parameters by changing its general proportions, dimensions or shape. The present invention is generally a computer software program which loads an existing data file which includes one or more design elements, such as parts or an assembly of parts, and then automatically morphs the design element's dimensions, proportions and/or shapes to meet target parameters input by a user. The present invention will create several groups of points corresponding to each surface and associated bounding curves of the existing design. It will then morph each group into a new shape as per the input requirements by the user, fit the morphed group into an infinite surface, create boundary curves for each morphed group and then trim the infinite surface to create the new, morphed surface. Repeating this process for all the surfaces of the CAD design element, the new morphed element is created.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

A. Introduction

Figure 1:
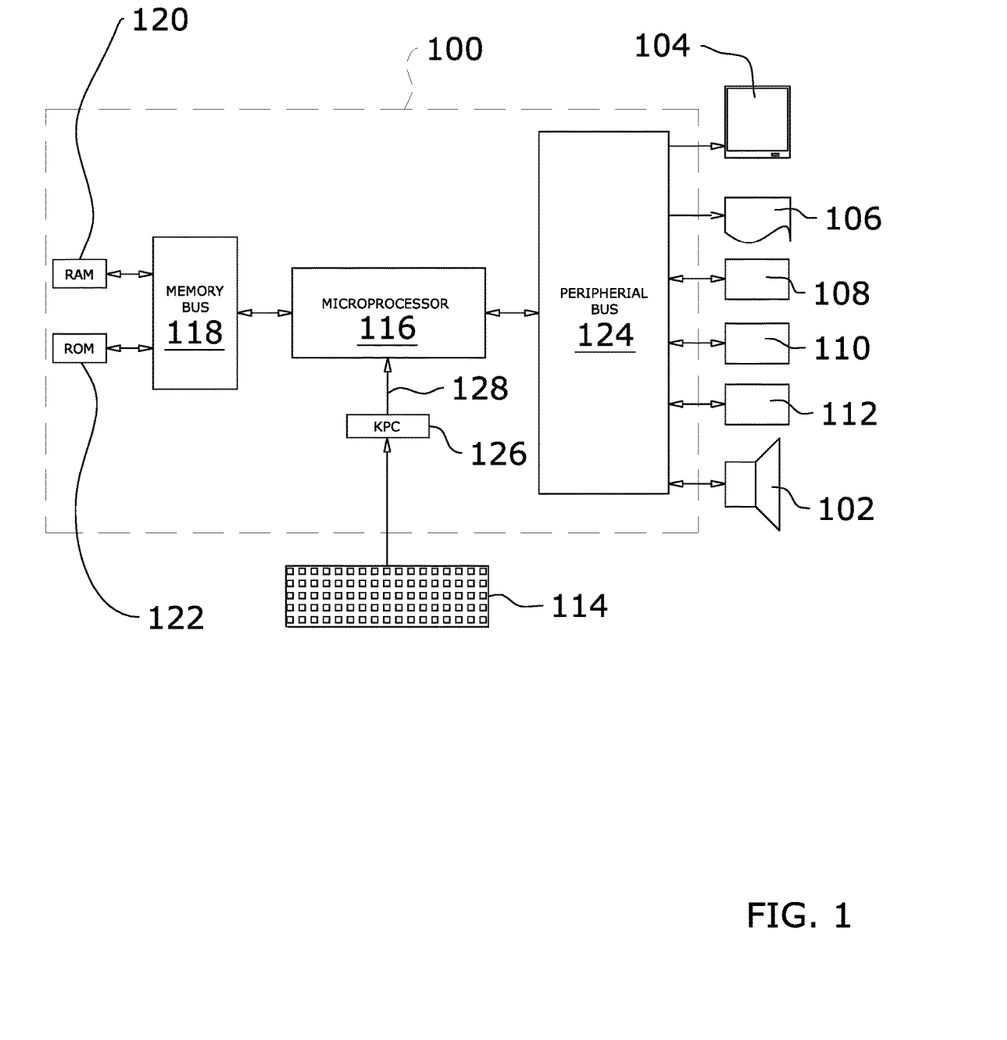
FIG. 1 is a block diagram of an exemplary computer system for practicing the present invention.
Figure 2:
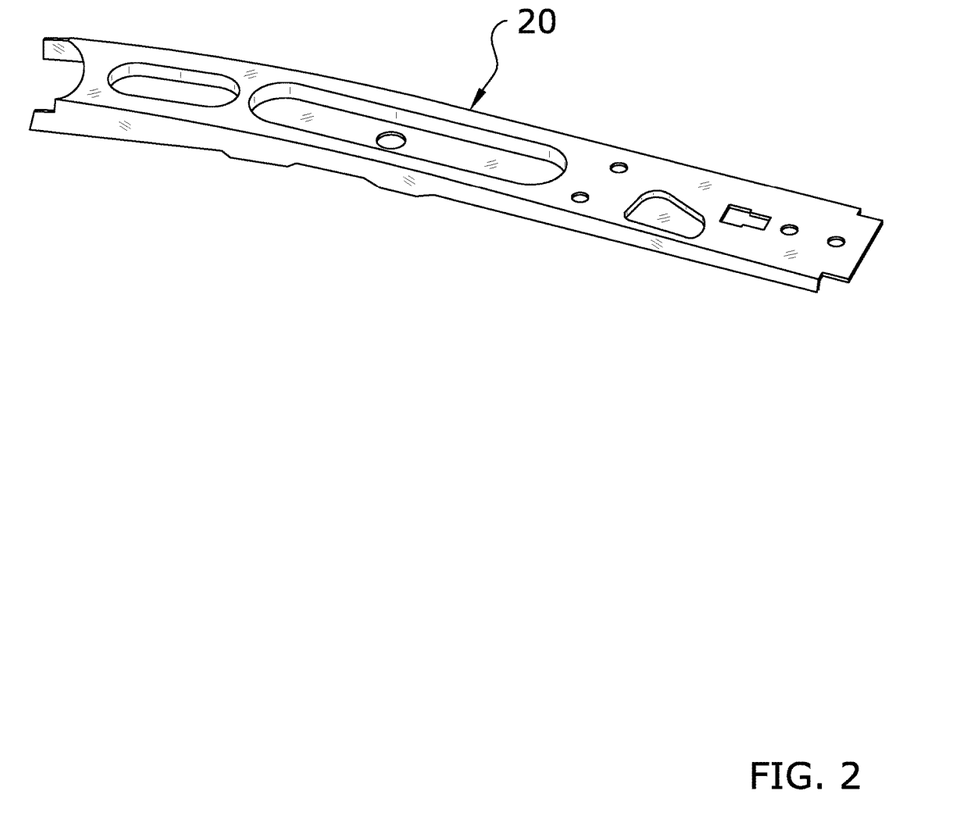
FIG. 2 is an illustration of an exemplary un-morphed design element.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The present invention may be operated as a computer program installed upon a computer-aided-design computer 100 (i.e. a computer used for computer-aided-design, such as with a CAD program as known in the arts), via a website or other system.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), flash drives, USB drives and computer instruction signals embodied in a transmission medium (with or without a carrier wave upon which the signals are modulated). For example, the transmission medium may include a communications network, such as the Internet.

B. Exemplary Computer System

FIG. 1 is a block diagram of an exemplary computer system 100 for practicing the various aspects of the present invention. The computer system 100 includes a display screen (or monitor) 104, a printer 106, a floppy disk drive 108, a hard disk drive 110, a network interface 112, and a keyboard 114. The computer system 100 also includes a microprocessor 116, a memory bus 118, random access memory (RAM) 120, read only memory (ROM) 122, a peripheral bus 124, and a keyboard controller 126. Computer system 100 can be a personal computer (such as an APPLE computer, an IBM computer, or one of the compatibles thereof), a workstation computer (such as a SUN MICROSYSTEMS or HEWLETT-PACKARD workstation), or various other types of computers. It can be appreciated that the computer system 100 may be comprised of various other electronic devices including but not limited to mobile phones, telephones, personal digital assistants (PDAs), handheld wireless devices, two-way radios, smart phones, communicators, video viewing units, television units, television receivers, cable television receivers, pagers, communication devices, and digital satellite receiver units.

The microprocessor 116 is a general-purpose digital processor that controls the operation of the computer system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by the microprocessor 116 to access the RAM 120 and the ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the computer system 100. In the described embodiment(s), these devices include a display screen 104, a printer device 106, a floppy disk drive 108, a hard disk drive 110, and a network interface 112. A keyboard controller 126 is used to receive input from the keyboard 114 and send decoded symbols for each pressed key to microprocessor 116 over bus 128.

The display screen 104 is an output device that displays images of data provided by the microprocessor 116 via the peripheral bus 124 or provided by other components in the computer system 100. The printer device 106 when operating as a printer provides an image on a sheet of paper or a similar surface. Other output devices such as a plotter, typesetter, etc. can be utilized in place of, or in addition to, the printer device 106.

The floppy disk drive 108 and the hard disk drive 110 can be utilized to store various types of data. The floppy disk drive 108 facilitates transporting such data to other computer systems, and the hard disk drive 110 permits fast access to large amounts of stored data.

The microprocessor 116 together with an operating system operate to execute computer code and produce and use data. The computer code and data may reside on RAM 120, ROM 122, or hard disk drive 110. The computer code and data can also reside on a removable program medium and loaded or installed onto computer system 100 when needed. Removable program mediums include, for example, CD-ROM, PC-CARD, floppy disk and magnetic tape.

The network interface circuit 112 is utilized to send and receive data over a network connected to other computer systems. An interface card or similar device and appropriate software implemented by microprocessor 116 can be utilized to connect the computer system 100 to an existing network and transfer data according to standard protocols.

The keyboard 114 is used by a user to input commands and other instructions to the computer system 100. Other types of user input devices can also be used in conjunction with the present invention. For example, pointing devices such as a computer mouse, a track ball, a stylus, or a tablet to manipulate a pointer on a screen of the computer system 100.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The present invention may be operated upon various operating systems such as but not limited to UNIX, MACINTOSH, LINUX, WINDOWS, PALMOS, EPOC, WINDOWS CE, FLEXOS, OS/9, and JAVAOS.

B. Exemplary Global Computer Network

The global computer network (e.g. Internet) is an exemplary communications network which may be utilized in combination with the present invention. The Internet is basically comprised of a "global computer network." A plurality of computer systems 100 around the world are in communication with one another via this global computer network and are able to transmit various types of data between one another. The communications between the computer systems may be accomplished via various methods such as but not limited to wireless, Ethernet, cable, direct connection, telephone lines, and satellite. One or more web servers typically provide the data to the computer systems connected via the Internet.

The present invention may also be utilized upon global computer networks, local area networks (LAN), wide area networks (WAN), campus area networks (CAN), metropolitan-area networks (MAN), and home area networks (HAN). Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, WEBTV, and MSN INTERNET SERVICES. The present invention preferably utilizes the Internet for transmitting data, however it can be appreciated that as future technologies are created that various aspects of the invention may be practiced with these improved technologies.

The present invention is preferably embodied within a software application installed upon the computer-aided-design computer 100. Any type of computer 100 known in the art may be utilized to practice the present invention, including personal computers, laptop computers, tablet computers, smart phones and the like. The present invention may also be embodied in various other manners such as but not limited to a central server computer or a web server that performs all functionality server-side and merely provide the results of the morphed CAD data to the computer 100.

C. CAD Files

The present invention is adapted to automatically and efficiently morph existing CAD design elements 20 to new target parameters. The existing CAD design elements 20 may be embodied in various types of files known in the art to store CAD data to assist with computer-aided-design. Various file formats known in the art may be utilized, such as .STEP, .IGS, .X_T, .X_B, .PRT, .CATPART, among others. The CAD data may have been previously compiled or prepared using any number of CAD software programs known in the art, such as AUTOCAD as offered by Autodesk, Inc.

The CAD design elements 20 may comprise a computer-aided-design of any type of element, such as parts or assemblies of parts. It is appreciated that the present invention may be utilized to morph any type of design which is stored within a CAD data file.

The CAD data file is in a computer readable file format and may be available directly from the computer or via downloading through a global computer network. In some embodiments, the CAD data file may be retained on a remote server and the functionality of the present invention may be performed either by the local computer or by the remote server directly, with the results being transmitted to the local computer after processing.

D. Operation of the Present Invention

The present invention is directed to methods, apparatuses, systems and computer-readable medium embodying software for performing the methods and enabling the system to morph a CAD design element 20 automatically from one configuration to a second, morphed configuration. In a preferred embodiment, the present invention is a software program written in C++, though it could in different embodiments be written in various other programming languages, which may operate in a standalone fashion or in combination with a CAD software program such as AUTOCAD by Autodesk, Inc.

Figure 7:
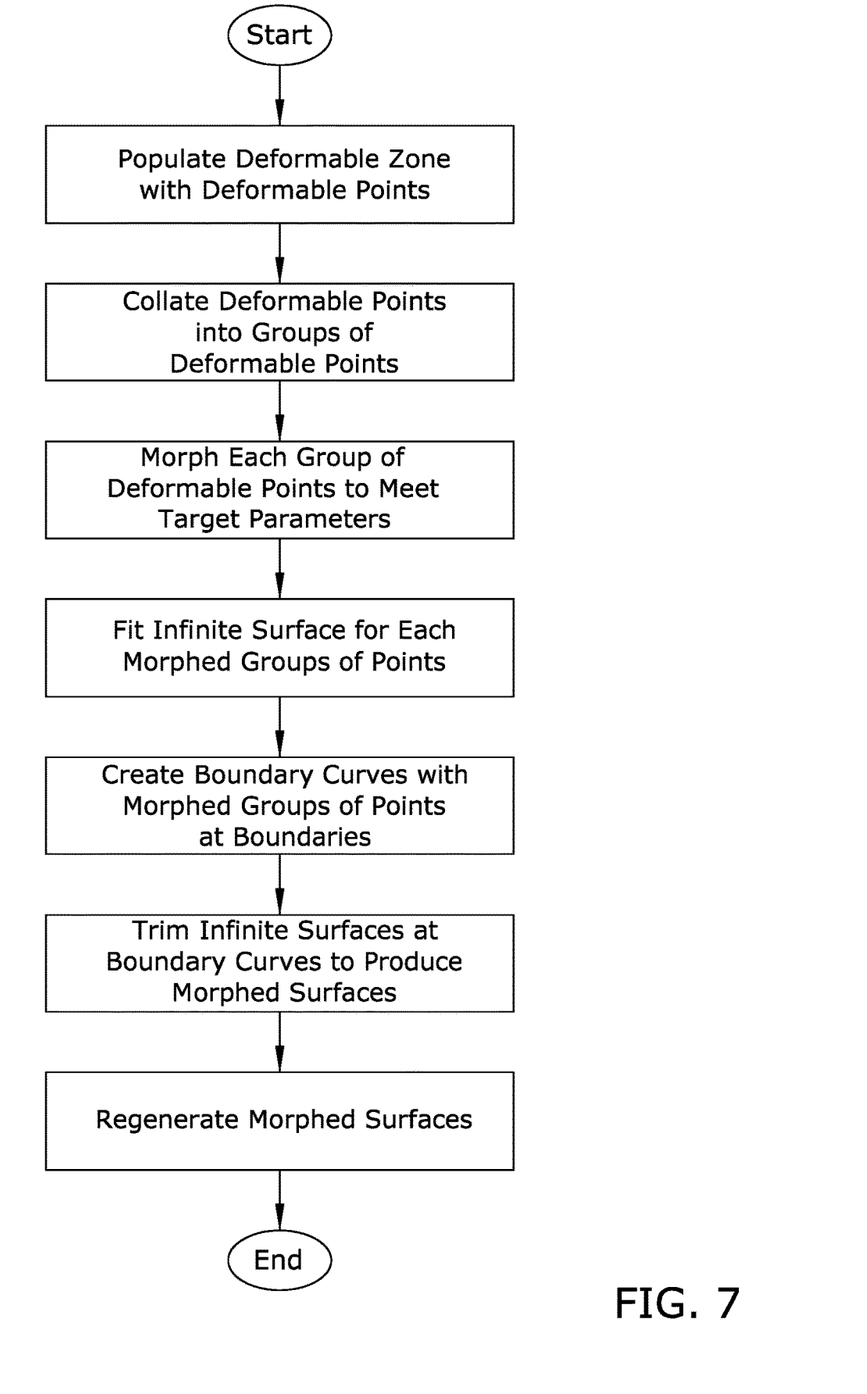
FIG. 7 is a flow chart illustrating the overall operations of the present invention.

FIG. 7 is a flow chart illustrating the overall processes of the present invention. As shown therein, broadly speaking, the present invention is comprised of first receiving and opening an existing CAD data file. The CAD data file may include one or more CAD design elements 20, any or all of which may be morphed using the processes described herein. Each CAD design element 20 will generally comprise several surfaces and curves which, in combination, form a design such as an existing part or assembly of parts. As mentioned above, various types of CAD data files may be utilized. The scope of the present invention should not be construed as being limited to CAD data files generated by any particular software product or methodology.

The raw CAD data may be stored on a local computer 100 or, in some cases, may be stored on a remote computer 100 or server which communicates with the local computer such as a via the Internet. The user of the present invention will first read in the CAD data file into the present invention. The present invention will process the CAD data file and display any or all of the CAD design elements 20 included therein. One or more of the CAD design elements 20 may be selected by the user of the present invention to be morphed by the present invention. Thus, the morphing processes of the present invention may be applied to a single CAD design element 20, to multiple CAD design elements 20 at once, or to multiple CAD design elements 20 in an iterative manner.

After selecting the one or more CAD design elements 20 to be morphed, the present invention will preferably extract that particular element 20 from any surrounding design elements so that the user may more easily view and manipulate the particular design element 20 to be morphed. However, in some embodiments the below processes may be performed within the context of a broader view which displays both selected and unselected CAD design elements 20.

Figure 3:
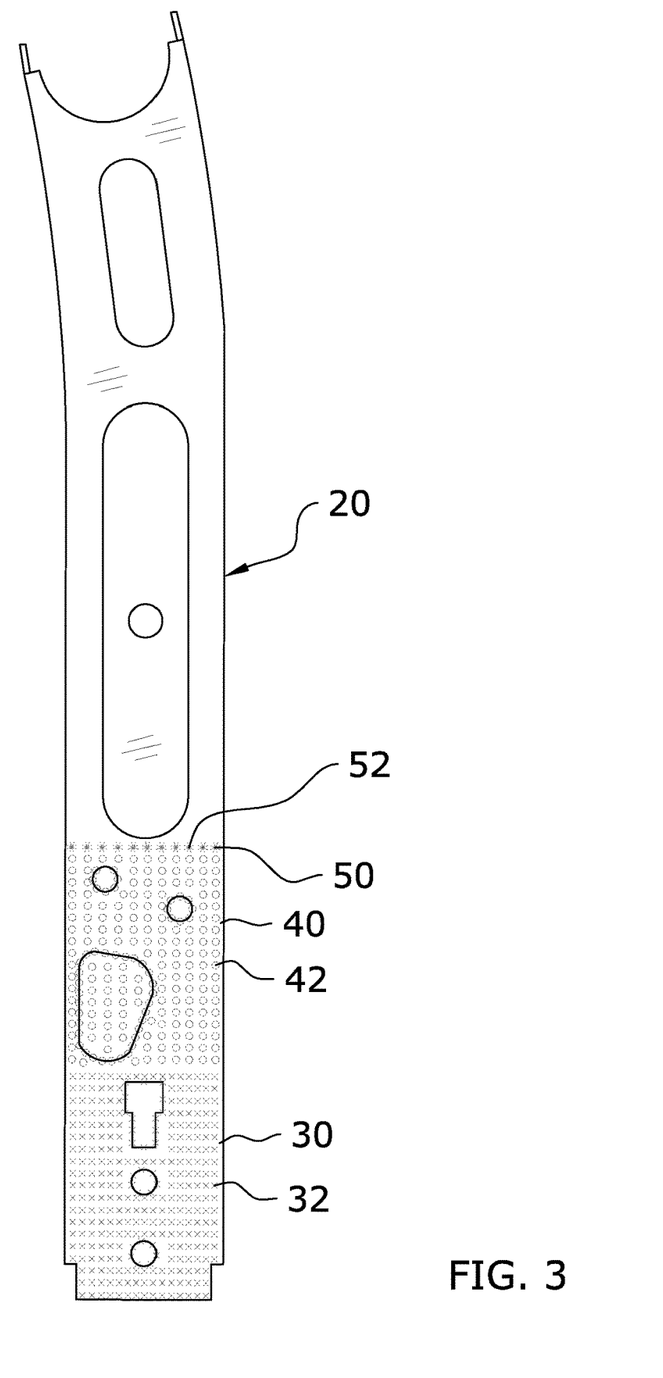
FIG. 3 is an illustration showing points on the un-morphed design element.

With the selected one or more CAD design elements 20 being displayed, the user will add control nodes 36, deformable nodes 46, and fixed nodes 56 to the CAD design element 20. Each of the nodes 36, 46, 56 will designate the boundaries of a respective control zone 30, deformable zone 40 and fixed zone 50 for purposes of morphing the design element 20. The relevant portions such as surfaces and boundaries of the surfaces 20 within each respective zone will be populated with a plurality of points 32, 42, 52 which will be grouped together and processed by the present invention in morphing the design element 20. FIG. 3 provides an illustrative example of a CAD design element populated with control points 32, deformable points 42, and fixed points 52.

Figure 4:
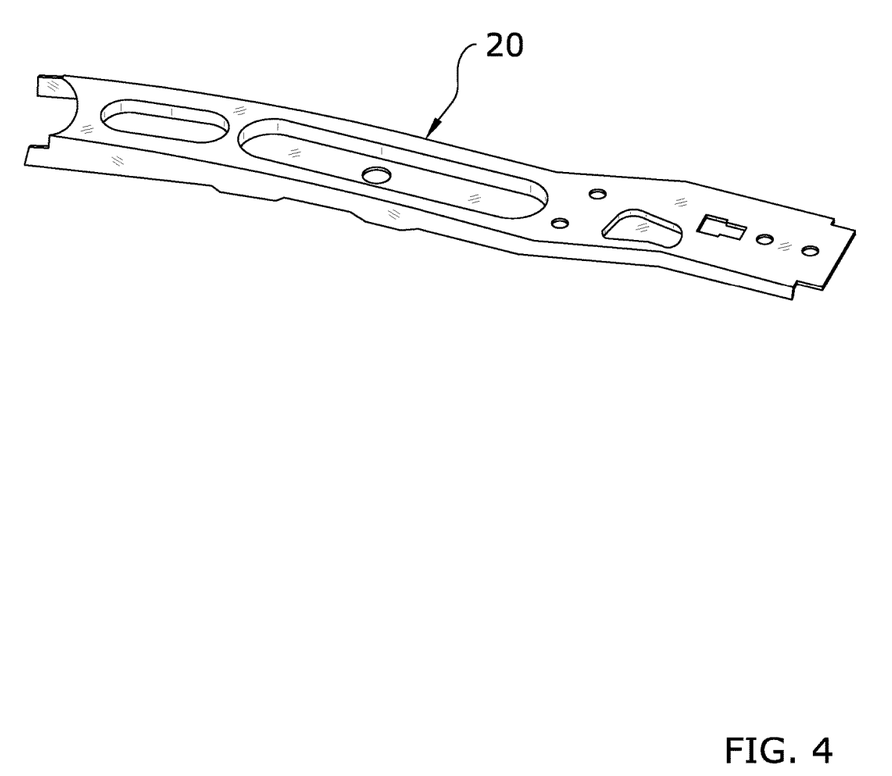
FIG. 4 is an illustration showing a morphed design element.

The nodes 36, 46, 56 defining the relevant zones 30, 40, 50 may be selected in a variety of manners within the present invention's computer program. By way of example and without limitation, the nodes 36, 46, 56 may be manually selected by entering orthogonal coordinates (such as Cartesian coordinates along an X-axis, Y-axis and/or Z-axis. Alternatively, boundaries may be manually drawn for each of the respective zones 30, 40, 50 such as is shown in FIG. 4.

The control zone 30 is populated by a plurality of control points 32. The control zone 30 represents the area of the design element 20 that will be directly transformed by the user using operations such as translation, rotation, projection etc. Depending on the nature of the design element 20 being morphed, there may be a plurality of control zones 30 each populated with its own plurality of control points 32 or, as shown in the figures, there may be a single control zone 30 populated with a plurality of control points 32. The present invention may display some indicia to identify the control zone 30, such as through lines, through different shapes of points being shown, or by highlighting the control zone 30 in a particular color. In some cases the control zone may be external to the design element also.

The deformable zone 40 is similarly populated by a plurality of deformable points 42. The deformable zone 40 represents the area of the design element 20 which will be morphed in accordance with the target parameters entered by the user into the present invention's computer program. Various types of deformations may be automatically made with the present invention, as will be described further herein. Depending on the nature of the design element 20 being morphed, there may be a single deformable zone populated with a plurality of deformable points 42 as shown in the figures or there may be a plurality of deformable zones 40 populated with their own discrete plurality of deformable points 42. In some embodiments, a first type of morphing may be applied to a first deformable zone 40 and a second type of morphing may be applied to a second deformable zone 40. The present invention may display some indicia to identify the deformable zone 40, such as through lines, through different shapes of points being shown, or by highlighting the deformable zone in a particular color.

The fixed zone 50 defines any portion of the design element 20 which will not be morphed but will be used to establish the morphing equations. In some uses of the present invention, a fixed zone 50 will not need to be defined, such as where there are no impacted portions of the design element 20 which will be impacted by the morphing of the deformation zone.

Figure 6:
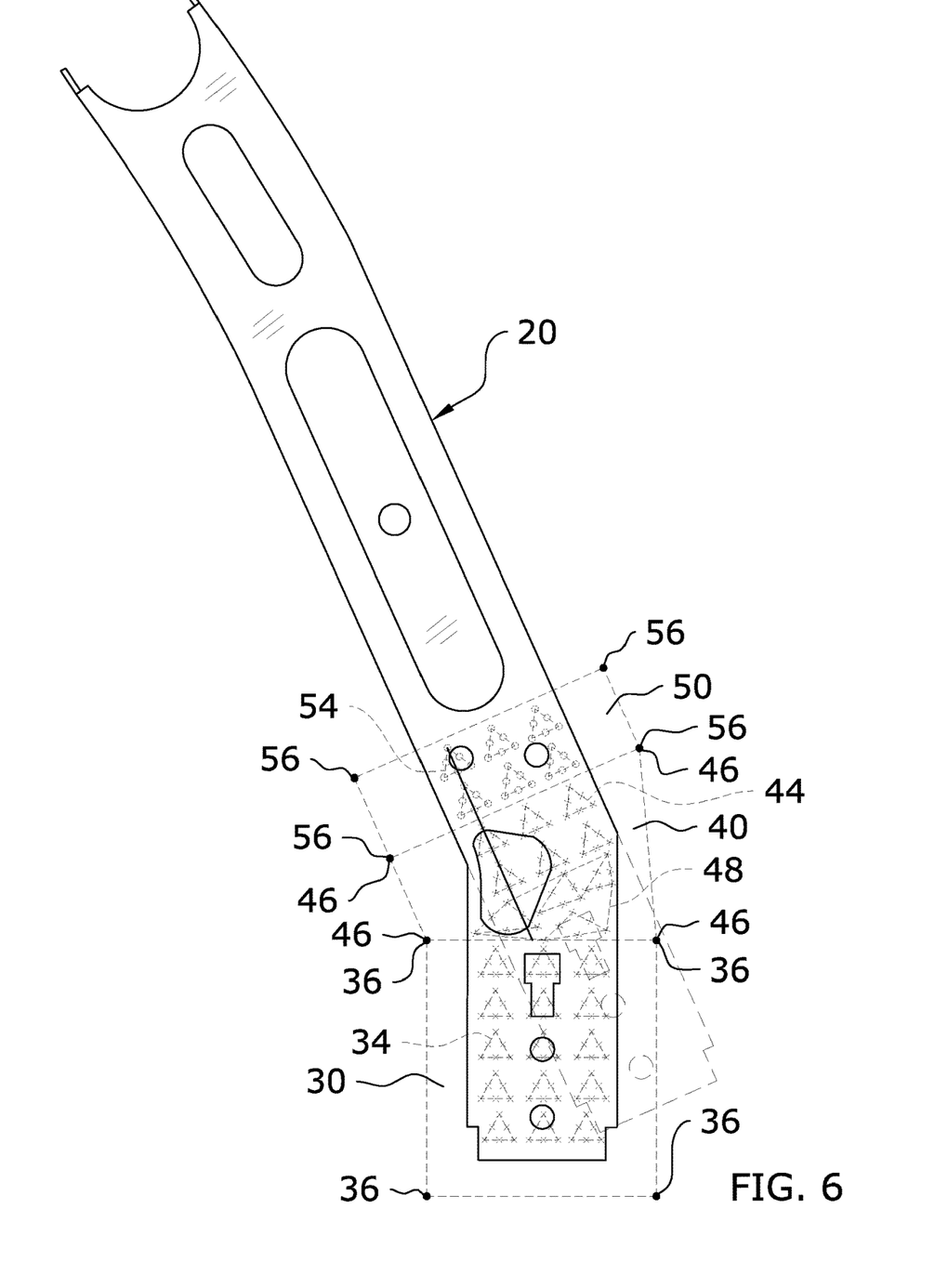
FIG. 6 is an illustration showing a morphed design element with morphed groups of points.

As shown in FIGS. 4 and 6, an exemplary control zone 30 is illustrated as being repositioned or moved with respect to the deformable zone 40, but not structurally changed in its own right. Depending on the nature of the design element 20 being morphed, there may be a single control zone 30 populated with a plurality of fixed points 52 as shown in the figures or there may be a plurality of fixed zones 50 populated with their own discrete plurality of control points 32. The present invention may display some indicia to identify the control zone 30, such as through lines, through different shapes of points being shown, or by highlighting the fixed zone in a particular color.

The user will be given the options of manually adjusting any of the zones 30, 40, 50 to meet the needs of that particular application. Nodes 36, 46, 56 may be replaced, extended, stitched, offset, and the like to provide the user with complete control of the definition of particular zones to be processed as the design element 20 is morphed.

With the control zone 30, deformable zone 40, and fixed zone 50 (if any) defined, the user may enter any target parameters which define the morphing being applied to the deformable zone of the design element 20. A wide range of morphing options will be presented to the user, including translation, rotation, offset, projection, re-scaling, propagating, partitioning, re-defining intersections, stitching, reflecting, detaching, and the like. The present invention will preferably be adapted to perform any number of morphs as may be needed in the modification of a design element 20.

After selecting the relevant morphing option, the present invention will prompt the user for specific target parameters to be applied in morphing the deformable zone(s). The user may manually input new target parameters governing the morphing of the design element 20, such as new proportions, dimensions or shapes.

By way of example, in the case of rotation, the user may be prompted to enter a value for one or more orthogonal coordinates which define the axis about which the rotation occurs as well as the magnitude of the rotation. FIG. 4 illustrates the design element 20 of FIG. 1 being rotated about its Y-Axis and FIG. 6 illustrates the design element 20 of FIG. 4 being rotated about its X-Axis.

Figure 5:
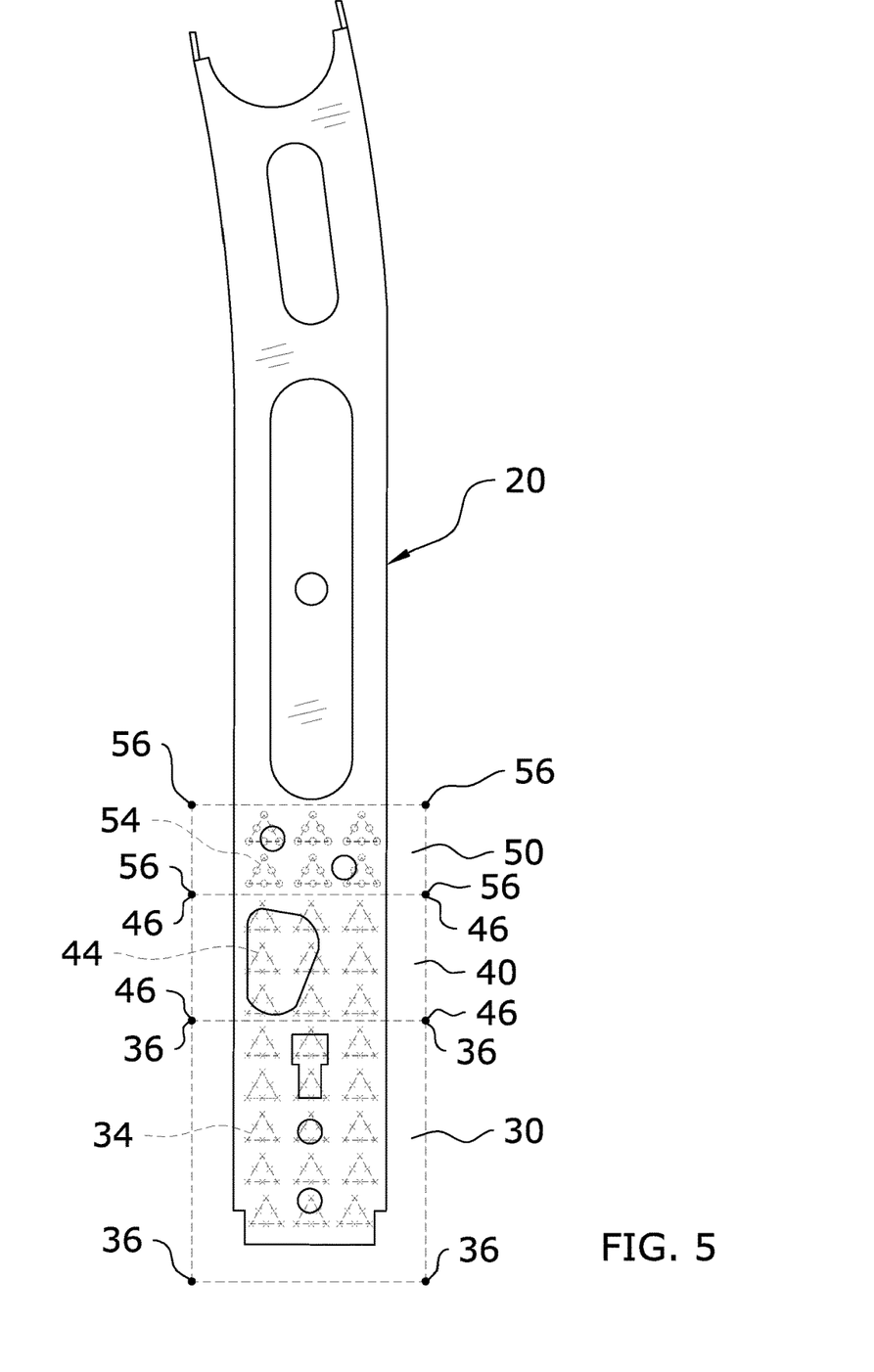
FIG. 5 is an illustration showing defined zones and groups of points along a design element.

With the zones 30, 40, 50 and the target parameters defined, the present invention will process the plurality of fixed points 52, deformable points 42, and control points 32 in accordance with the processes defined below. First, as best shown in FIG. 5, the plurality of points 32, 42, 52 will be collated into a plurality of groups of points 34, 44, 54—one per CAD surface 34, 44, 54, the groups 34, 44, 54 each being comprised of a plurality of points 32, 42, 52 placed inside of each CAD surface and also on the boundaries of each CAD surface. The points associated 32, 42, 52 with each CAD surface 34, 44, 54 represents a group 34, 44, 54. The collection of all the points 32, 42, 52 belonging to all the groups 34, 44, 54 will equate to the sum total of control, deformable and fixed points 32, 42, 52. The uniqueness of the present invention is found in the treatment of the points 32, 42, 52 within and the boundary of each CAD surface 34, 44, 54 as a distinct group 34, 44, 54.

After collating the points 32, 42, 52 of each CAD surface into discrete groups of points 34, 44, 54, the present invention will transform each group of points 34, 44, 54 to a new shape by altering the arrangement of each point 32, 42, 52 within a group 34, 44, 54 according to the target parameters of the user by utilizing a set of morphing transformations. Generally, only those groups of points 44 within the deformable zone 40 and control zone 30 will be altered, with the groups of points 54 within the fixed zone 50 remaining fixed.

Each group of deformable points 44 will thus be transformed from their original states into a morphed group of points 46. These morphing transformations may be carried out using existing control blocks, freeform, field based morphing, as well as other methods for morphing groups of points. The deformable points 42 will be transformed to meet the new target parameters input by the user by altering each of the plurality of groups of deformable points 44 in a manner to complete the morph(s) required.

If an original CAD surface and hence the corresponding morphed group happens to be a 3 or 4 sided surface, then a 'Coons' patch surface is generated representing the morphed group using the boundary curves generated from the morphed boundary points of the group. If the original surface and hence the corresponding morphed group happens to be anything other than a 3 or 4 sided surface, then an infinite surface will be fitted for each morphed group of points 46. Morphed groups of points representing the boundaries of each surface within a morphed group will be used to create boundary curves representing the morphed shape of the design element. By using the boundary curves, the present invention may trim the infinite surface to produce a new, morphed surface for each of the morphed group of points. These steps are performed for each group of deformable points 44 collated from the original design element 20. The morphed surfaces are regenerated and combined to produce the new morphed design element 20, which will be outputted by the system. This process may be repeated automatically in an iterative manner for a large number of design elements within a particular part or assembly of parts.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the invention will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the present invention, suitable methods and materials are described above. Thus, the present invention is not intended to be limited to the embodiments shown, but is to be accorded the widest scope consistent with the principles and features disclosed herein.

What is claimed is:

1. A method of morphing a design element by a computer system, comprising the steps of:
   receiving the design element;
   receiving an identification of a selected design element to be morphed into a morphed design element;
   receiving an identification of a plurality of points within the selected design element;
   grouping the plurality of points into a plurality of groups of points;
   receiving an identification of one or more of the groups of points as control groups of points, wherein the control groups of points are not morphed;
   receiving an identification of one or more of the groups of points as deformable groups of points, wherein the deformable groups of points are morphed;
   receiving an identification of one or more of the groups of points as fixed groups of points, wherein the fixed groups of points are used to establish morphing equations;
   defining boundary curves using the groups of points along a boundary of the design element;
   creating an infinite surface with the boundary curves for each of the groups of points having more than four sides;
   trimming the infinite surface along the boundary curves to create a plurality of morphed surfaces; and
   regenerating and combining each of the morphed surfaces to create a morphed design element.

2. The method of claim 1, further comprising the step of receiving a morphing type, the morphing type defining the type of morphing to be applied to the selected design element.

3. The method of claim 2, wherein the morphing type is selected from a group consisting of rotation, translation, offset, projection, re-scaling, propagating, partitioning, re-defining intersections, stitching, reflecting, and detaching.

4. The method of claim 3, further comprising the step of receiving target parameters defining morphed parameters of the morphing type.

5. The method of claim 4, wherein the target parameters are selected from a group consisting of proportions, dimensions, and shapes.

6. The method of claim 1, further comprising the step of creating a Coons patch with the boundary curves for each of the groups of points having between three and four sides.

7. The method of claim 6, wherein each of the groups of points includes three or more sides.

8. A method of morphing a design element by a computer system, comprising the steps of:
receiving the design element;
receiving an identification of a selected design element to be morphed into a morphed CAD design element;
receiving an identification of a plurality of points within the selected design element;
receiving an identification of one or more of the groups of points as control groups of points, wherein the control groups of points are not morphed;
receiving an identification of one or more of the groups of points as deformable groups of points, wherein the deformable groups of points are morphed;
receiving an identification of one or more of the groups of points as fixed groups of points, wherein the fixed groups of points are used to establish morphing equations;
defining a fixed zone encapsulating the fixed groups of points;
receiving a morphing type, the morphing type defining the type of morphing to be applied to the selected design element;
wherein the morphing type is selected from a group consisting of rotation, translation, offset, projection, re-scaling, propagating, partitioning, re-defining intersections, stitching, reflecting, and detaching;
receiving target parameters defining morphed parameters of the morphing type;
target parameters are selected from a group consisting of proportions, dimensions, and shapes;
grouping the plurality of points into a plurality of groups of points;
defining boundary curves using the groups of points along a boundary of the design element;
creating an infinite surface with the boundary curves for each of the groups of points having more than four sides;
trimming the infinite surface along the boundary curves to create a plurality of morphed surfaces; and
regenerating and combining each of the morphed surfaces to create a morphed design element.

9. The method of claim 8, further comprising the step of receiving an identification of one or more of the groups of points as control groups of points, wherein the control groups of points are not morphed.

10. The method of claim 9, further comprising the step of defining a control zone encapsulating the control groups of points.

11. The method of claim 10, further comprising the step of receiving an identification of one or more of the groups of points as deformable groups of points, wherein the deformable groups of points are morphed.

12. The method of claim 11, further comprising the step of defining a deformable zone encapsulating the deformable groups of points.

13. The method of claim 8, further comprising the step of creating a Coons patch with the boundary curves for each of the groups of points having between three and four sides.

14. The method of claim 13, wherein each of the groups of points includes three or more sides.

15. The method of claim 8, further comprising the step of receiving a morphing type, the morphing type defining the type of morphing to be applied to the selected design element.

16. The method of claim 15, wherein the morphing type is selected from a group consisting of rotation, translation, offset, projection, re-scaling, propagating, partitioning, re-defining intersections, stitching, reflecting, and detaching.

17. A method of morphing a design element by a computer system, comprising the steps of:
receiving the design element;
receiving an identification of a selected design element to be morphed into a morphed CAD design element;
receiving an identification of a plurality of points within the selected design element;
grouping the plurality of points into a plurality of groups of points;
receiving an identification of one or more of the groups of points as control groups of points, wherein the control groups of points are not morphed;
receiving an identification of one or more of the groups of points as deformable groups of points, wherein the deformable groups of points are morphed;
receiving an identification of one or more of the groups of points as fixed groups of points, wherein the fixed groups of points are used to establish morphing equations;
defining boundary curves using the groups of points along a boundary of the design element;
creating an infinite surface with the boundary curves for each of the groups of points having more than four sides;
creating a Coons patch with the boundary curves for each of the groups of points having between three and four sides;
trimming the infinite surface along the boundary curves to create a plurality of morphed surfaces; and
regenerating and combining each of the morphed surfaces to create a morphed design element.

* * * * *